United States Patent
Hsu et al.

(10) Patent No.: US 10,106,218 B2
(45) Date of Patent: Oct. 23, 2018

(54) VEHICLE TILTING SYSTEM AND TRICYCLE

(71) Applicant: Tomson Technology Corporation, Taipei (TW)

(72) Inventors: Su-Yuen Hsu, Taipei (TW); Hsueh-Yung Lin, Taipei (TW)

(73) Assignee: TOMSON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/366,394

(22) Filed: Dec. 1, 2016

(65) Prior Publication Data

US 2017/0158277 A1    Jun. 8, 2017

(30) Foreign Application Priority Data

Dec. 2, 2015   (TW) .............................. 104140412 A (51) Int. Cl.
*B62K 5/10*   (2013.01)
*B62K 5/027*  (2013.01)
*B62K 5/06*   (2006.01)

(52) U.S. Cl.
CPC .............. *B62K 5/10* (2013.01); *B62K 5/027* (2013.01); *B62K 5/06* (2013.01); *B60Y 2200/122* (2013.01); *B60Y 2200/13* (2013.01); *B60Y 2410/102* (2013.01); *B62K 2204/00* (2013.01)

(58) Field of Classification Search
CPC ... B62K 5/00; B62K 5/02; B62K 5/06; B62K 5/10; B62K 5/027; B60Y 2200/13; B60Y 2200/122
See application file for complete search history.

(56) References Cited

U.S. PATENT DOCUMENTS

| | | | | |
|---|---|---|---|---|
| 1,285,472 A | * | 11/1918 | Trenam .................. | B62K 5/027 180/217 |
| 3,504,934 A | * | 4/1970 | Wallis ...................... | B62K 5/02 180/217 |
| 3,605,929 A | * | 9/1971 | Rolland ................. | B62D 61/08 180/208 |
| 3,698,502 A | * | 10/1972 | Patin ...................... | B62D 37/04 180/215 |
| 3,781,031 A | * | 12/1973 | Patin ...................... | B62D 37/04 180/210 |
| 4,159,752 A | * | 7/1979 | Kanno ................... | B62D 61/08 180/210 |
| 5,765,846 A | * | 6/1998 | Braun .................. | B60G 21/026 280/124.103 |
| 2004/0100059 A1 | * | 5/2004 | Van Den Brink ... | B60G 21/007 280/124.103 |
| 2010/0314179 A1 | * | 12/2010 | Gibson .................... | B62J 17/08 180/2.2 |

\* cited by examiner

*Primary Examiner* — Frank B Vanaman
(74) *Attorney, Agent, or Firm* — Muncy, Geissler, Olds & Lowe, P.C.

(57) ABSTRACT

A vehicle tilting system is used for a tricycle. The tricycle has a front body and a rear body. The front body has a front wheel. The rear body has two rear wheels. The vehicle tilting system has a track assembly and a sliding base assembly. The track assembly is arcuate in shape. The sliding base assembly slides on the track assembly.

13 Claims, 7 Drawing Sheets

VEHICLE TILTING SYSTEM AND TRICYCLE

BACKGROUND OF THE INVENTION

1. Field of the Invention

The present invention relates to a vehicle tilting system, and particularly to a vehicle tilting system applicable to a tricycle.

2. Description of the Related Art

In recent years, due to the lack of energy resources and the rise of environmental awareness, electric motorcycles have received increasing public attention. Electric motorcycles provide a clean and energy-saving means of transportation. Currently, the electric motorcycles on the market face a common problem; i.e., their range is too limited. Because of this disadvantage, electric motorcycles are not generally favored by consumers. Regarding this shortcoming, the most direct solution is to increase the number of batteries. In the case of two-wheeled vehicles, increasing the number of batteries increases the weight of the vehicles and consequently renders riding or unpowered maneuvering difficult.

Accordingly, the present invention provides a tricycle structure to solve the problem that an electric motorcycle is too heavy to ride. However, traditional tricycles are not agile in cornering and leaning; they do not maneuver the same as two-wheeled vehicles.

SUMMARY OF THE INVENTION

Accordingly, the present invention is intended to resolve the leaning and cornering agility issue of traditional tricycles.

To achieve the above objective, the present invention provides a vehicle tilting system applicable to a tricycle. The tricycle includes a front body and a rear body. The front body includes a front wheel, and the rear body includes two rear wheels. The vehicle tilting system, which is connected to the front body and the rear body, includes a track assembly and a sliding base assembly. The track assembly is arcuate in shape. The sliding base assembly is constrained except that it can slide on the track assembly.

Through the embodiment described above, the vehicle tilting system of the present invention has at least the following advantage: The connection of the front body and the rear body with the track assembly and the sliding base assembly allows only the front body to tilt when the tricycle turns, so that the rear body can remain stable.

DETAILED DESCRIPTION OF THE PREFERRED EMBODIMENT

To facilitate understanding of the technical content of the present invention, a preferred embodiment is described below.

Figure 1:
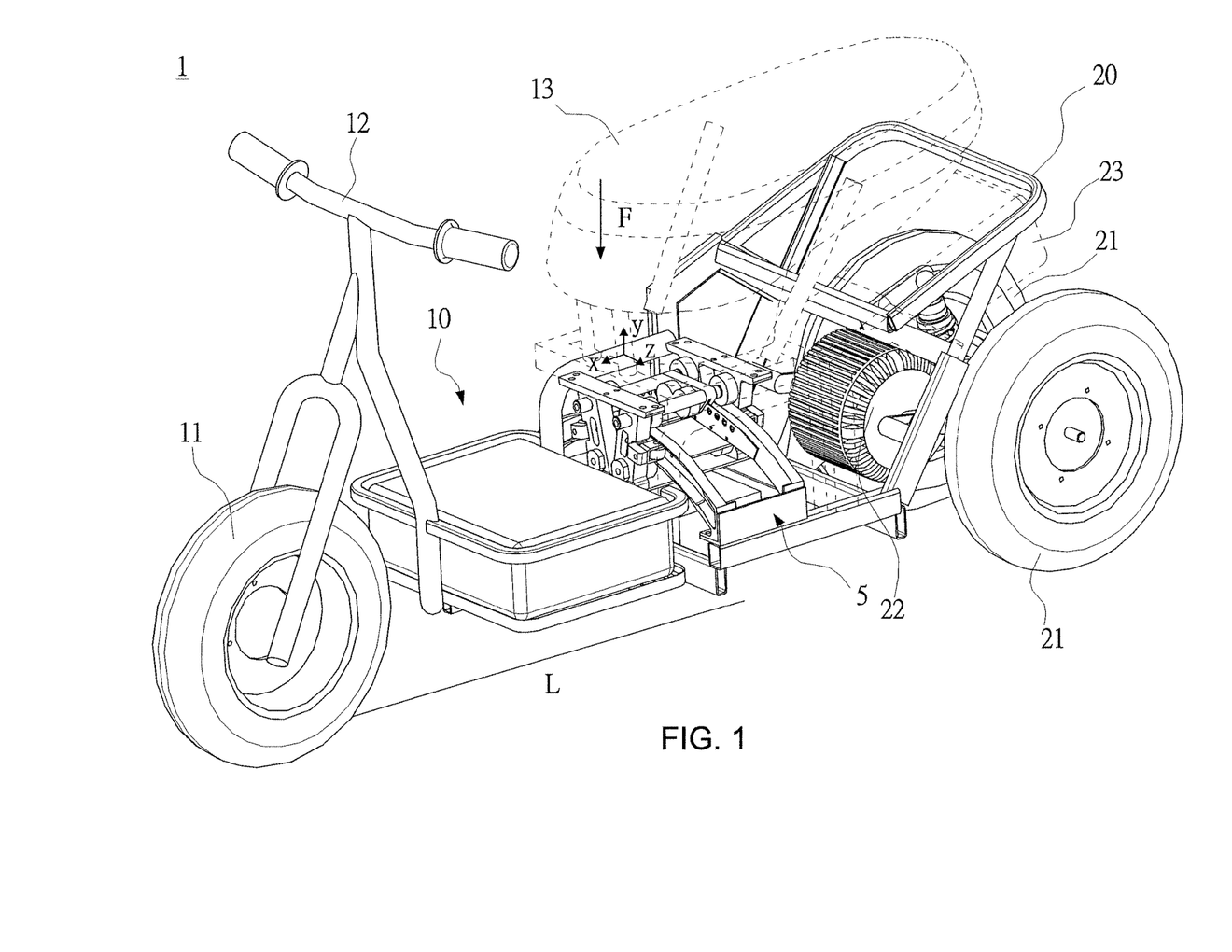
FIG. 1 is a schematic three-dimensional illustration of a tricycle of the present invention.

As shown in FIG. 1, the present invention provides a tricycle 1, especially an electric tricycle 1. The tricycle 1 of the present invention includes a front body 10, a rear body 20 and a vehicle tilting system 5. The vehicle tilting system 5 is connected to the front body 10 and the rear body 20. With this mechanism design, the front body 10 is connected to and can swing with respect to the rear body 20. The front body 10 includes a front wheel 11, a stem 12, and a saddle 13. The stem 12 is used to control the vehicle body. To make the drawings easier to view, part of the conventional structure of the front body 10 is omitted. The rear body 20 includes a pair of rear wheels 21, a driving device 22, and at least one power supply 23. That is, the rear body 20 accounts for a significant portion of the weight of the tricycle 1, and the tricycle 1 is propelled by the rear wheels 21.

Figure 2:
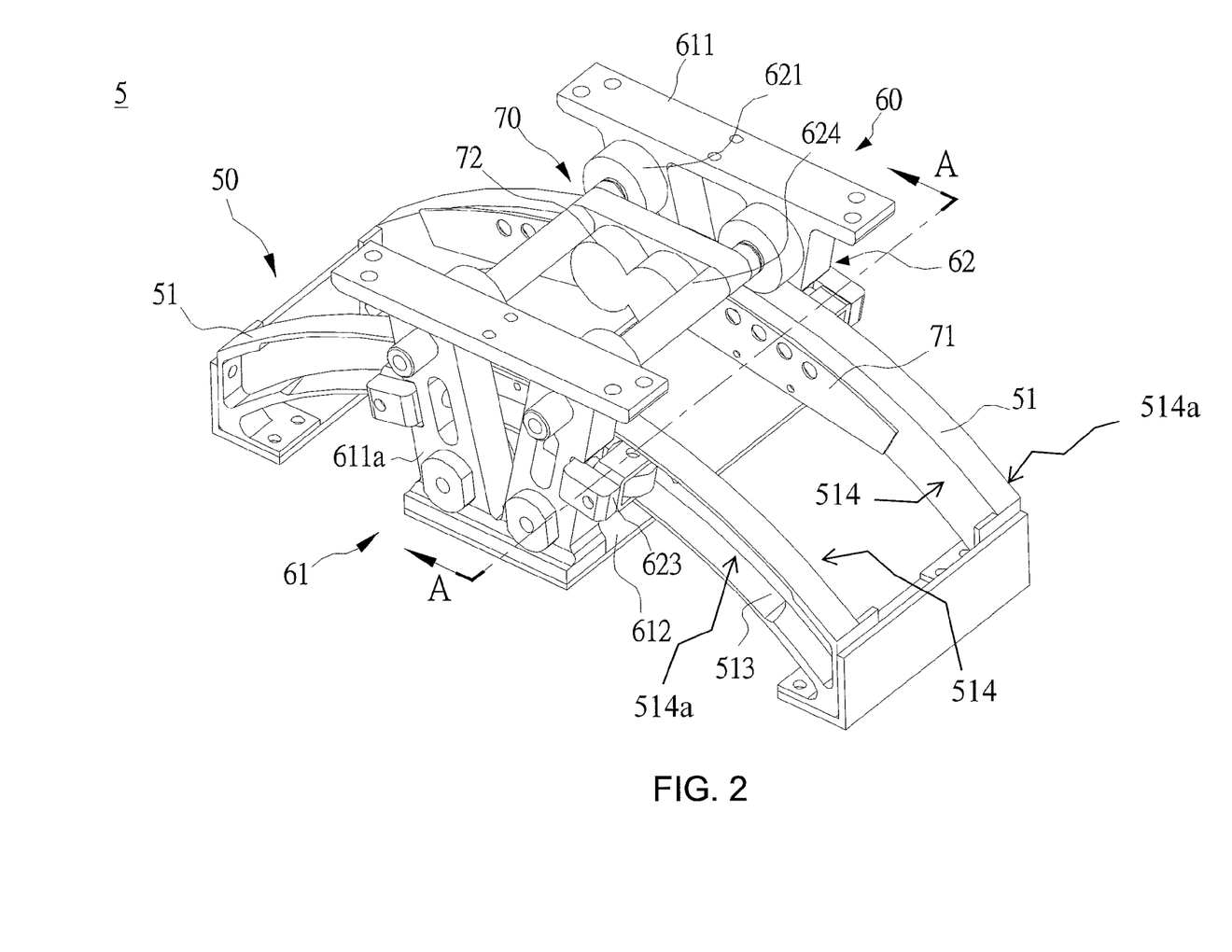
FIG. 2 is a schematic three-dimensional illustration of a vehicle tilting system of the present invention.
Figure 3:
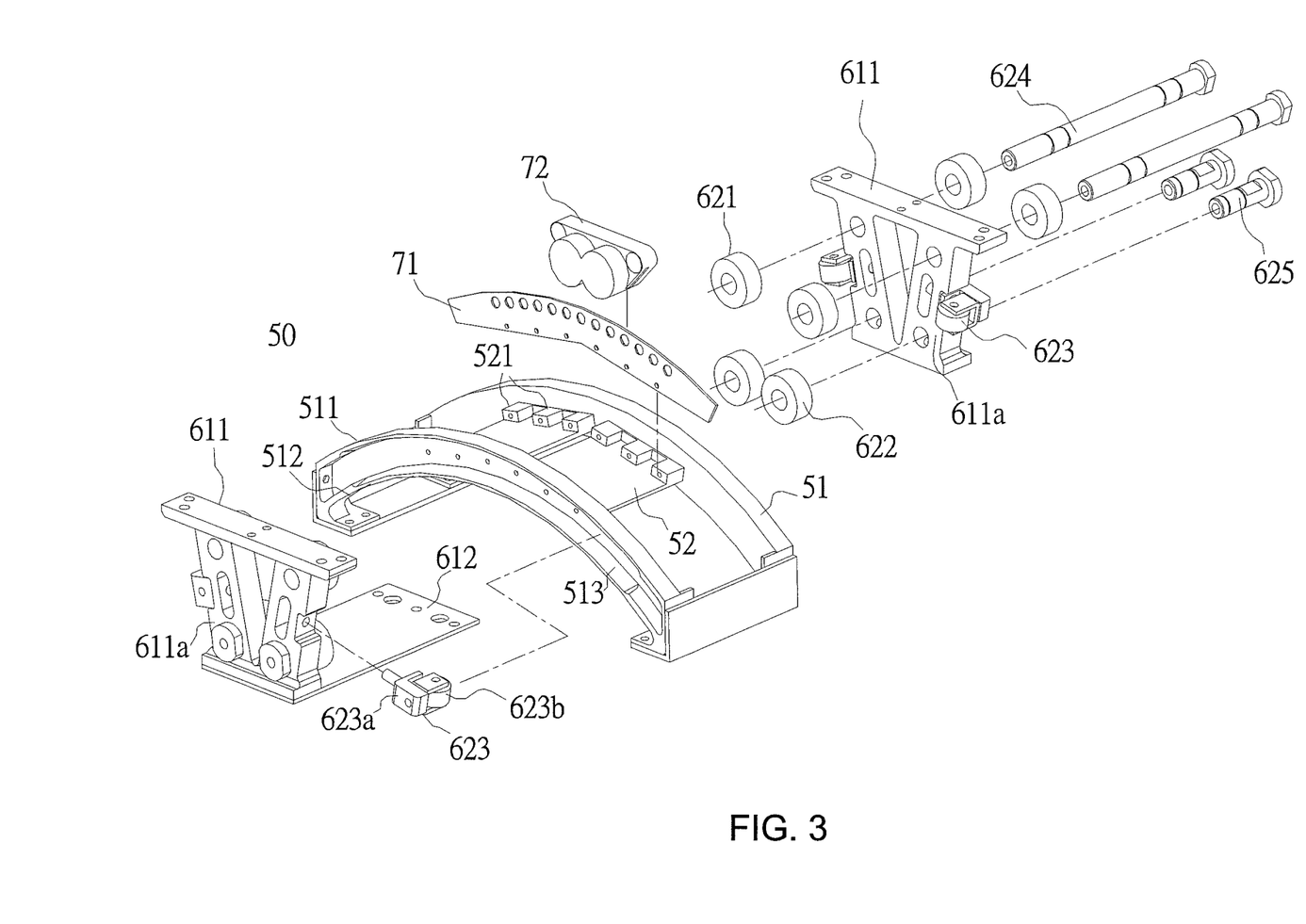
FIG. 3 is an exploded view of a vehicle tilting system of the present invention.
Figure 5:
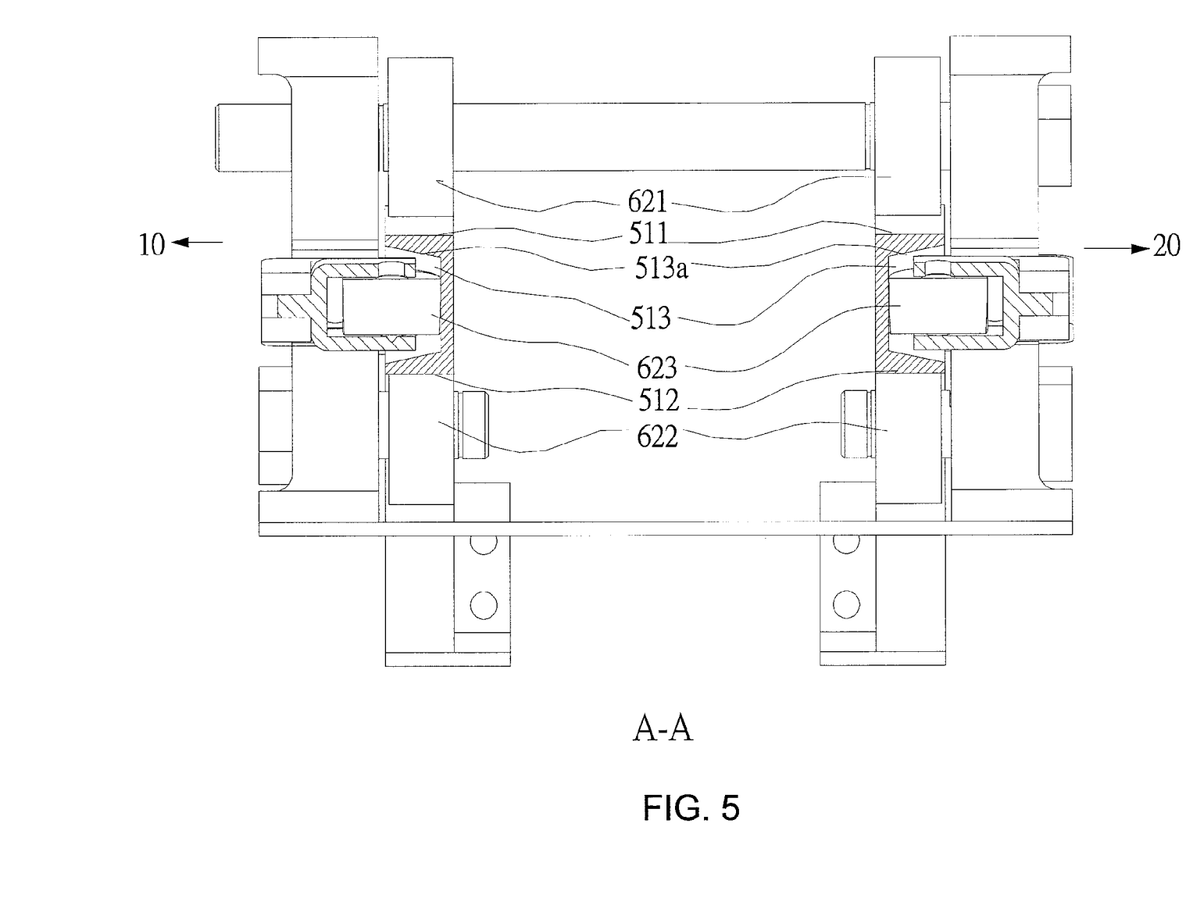
FIG. 5 is a cross-sectional view showing a vehicle tilting system of the present invention at the cross-section cutting line A-A of FIG. 2.

As shown in FIGS. 2 and 3, the vehicle tilting system 5 includes a track assembly 50, a sliding base assembly 60 and a tilt-positioning mechanism 70. The track assembly 50 includes a pair of arcuate tracks 51 and a rib plate 52. The rib plate 52 has a U shape, whose front and rear vertical tabs are attached to the two arcuate tracks 51 to maintain the overall structural rigidity and strength of the track assembly 50. Each of the arcuate tracks 51 has an upper contact surface 511, a lower contact surface 512, an inside face 514 and an outside face 514a. A groove 513 is provided between the upper contact surface 511 and the lower contact surface 512. The inside face 514 and the outside face 514a are two opposite faces of the arcuate track 51. The outside face 514a is not facing the other arcuate track 51, and the inside face 514 is facing the other arcuate track 51. The opening of the groove 513 is on the outside face 514a of each arcuate track 51. The normal direction of the plane that the arc of the arcuate track 51 lies in is substantially parallel with the ground. The effect will be described later. As shown in FIG. 5, the groove 513 has a pair of walls 513a. The walls 513a taper from the inside face 514 of the arcuate track 51 to the outside face 514a of the arcuate track 51. In other words, the walls 513a are thinner near the opening of the groove 513 than near the bottom of the groove 513. Also, a plurality of attachment blocks 521 are provided on the rib plate 52.

As shown in FIG. 2, the sliding base assembly 60 includes a sliding base body 61 and a pair of roller sets 62 disposed on the sliding base body 61. The sliding base body 61 includes a pair of sliding carriages 611 and a bottom plate 612. The bottom plate 612 is connected to the two sliding carriages 611. The sliding carriages 611 have support columns 611a, and the two support columns 611a are arranged in a V shape. The two roller sets 62 are respectively allocated on the two sliding carriages 611. Each roller set 62 includes a pair of upper rollers 621, a pair of lower rollers 622, and a pair of side rollers 623. The allocation of one roller set 62 on one sliding carriage 611 is described as follows. The upper rollers 621 and the lower rollers 622 are allocated on the inside of the sliding carriages 611 (the side facing the other sliding carriage 611). The two upper rollers 621 are respectively allocated on the two support columns 611a, and the two side rollers 623 are respectively allocated on the edges of the two support columns 611a. Each of the side rollers 623 includes a connecting element 623a and a wheel body 623b. The wheel body 623b is coupled to the connecting element 623a. The wheel body 623b rotates with respect to the connecting element 623a by using the coupling as the axis of rotation. The connecting element 623a is coupled to the edge of the support column 611a. The connecting element 623a can rotate with respect to the support column 611a. The roller set 625 further includes a pair of connecting shafts 624 and a pair of roller shafts 625. The connecting shafts 624 run through the upper rollers 621, and the roller shafts 625 run through the lower rollers 622, so that the upper rollers 621 and the lower rollers 622 are securely set on the corresponding sliding carriage 611. As shown in FIG. 3, the connecting shafts 624 interconnect the upper rollers 621 of both sliding carriages 611 to prevent outward separation of the two sliding carriages 611 during assembly.

The tilt-positioning mechanism 70 includes a disc brake piece 71 and a holding element 72. The holding element 72 can adjustably grip the disc brake piece 71.

In the above, the components are described individually. The spatial relationships among the components are described below.

Figure 4:
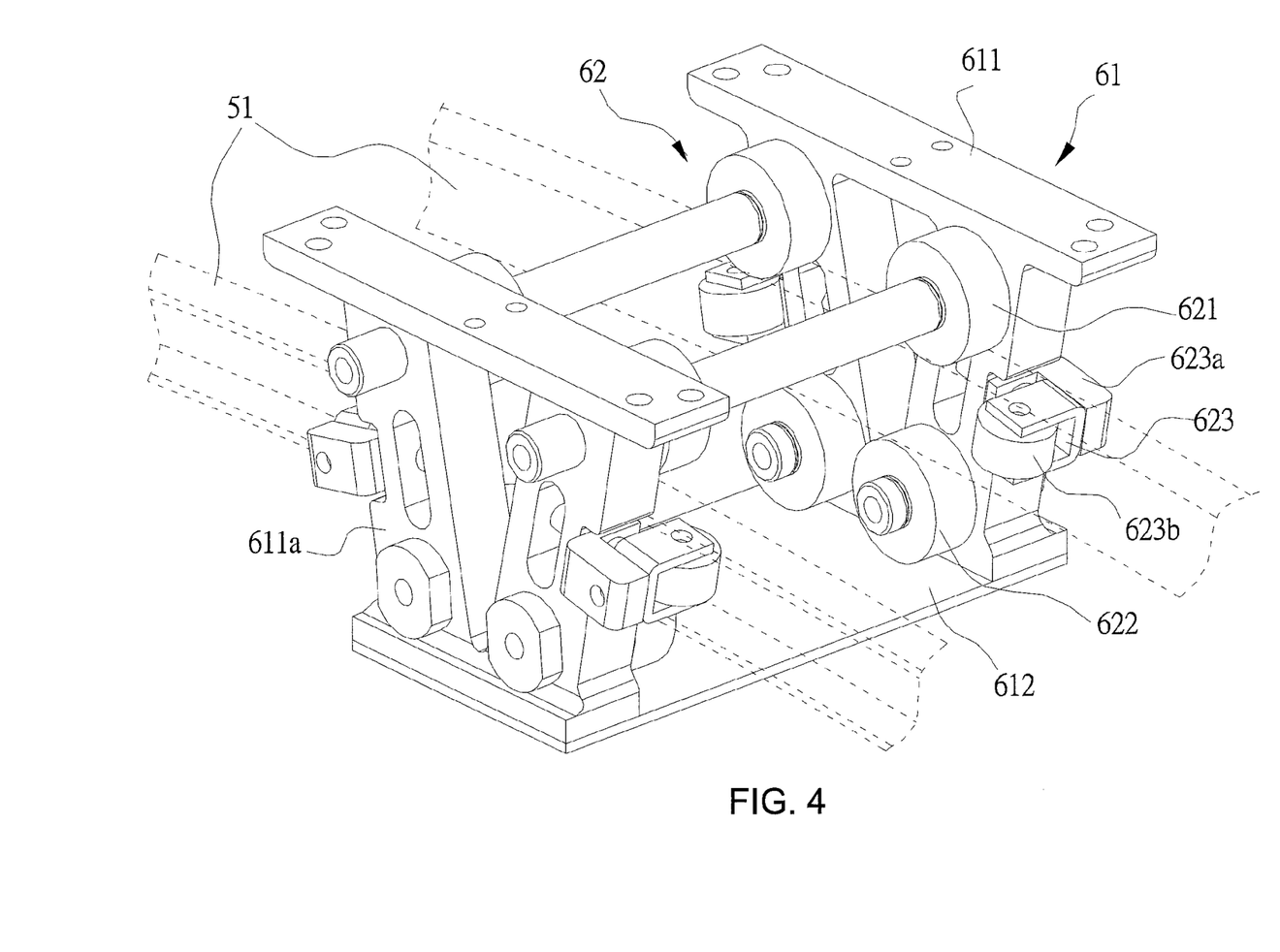
FIG. 4 is a subassembly view of a vehicle tilting system of the present invention.

As shown in FIG. 4, the sliding base assembly 60 is disposed on the track assembly 50. Specifically, the two sliding carriages 611 are respectively disposed on the outside faces 514a of the two arcuate tracks 51, the upper rollers 621 are in contact with the respective upper contact surfaces 511 of the arcuate tracks 51, the lower rollers 622 are in contact with the respective lower contact surfaces 512 of the arcuate tracks 51, the side rollers 623 are disposed in the corresponding grooves 513 of the arcuate tracks 51, and the wheel bodies 623b of the side rollers 623 are in contact with the bottom of the respective grooves 513. As described above, the two support columns 611a of the sliding carriage 611 are arranged in a V shape. When the sliding base assembly 60 is disposed on the track assembly 50, the two support columns 611a extend in the radial direction of the arcuate tracks 51. Therefore, the normal forces between the upper roller 621 and the upper contact surface 511, and between the lower roller 622 and the lower contact surface 512 are in the radial direction of the arcuate tracks 51. That is, the normal forces are substantially parallel with the support columns 611a. The arrangement avoids deformation of the two support columns 611a due to bending moments and facilitates the sliding of the roller set assembly 60 along the arcuate track 51.

The disc brake piece 71 is fixed to the attachment blocks 521 of the track assembly 50, so that the disc brake piece 71 is in a vicinity of the arcuate track 51. The holding element 72 is installed on the connecting shafts 624.

In the present invention, the sliding base assembly 60 is connected to the front body 10, and the track assembly 50 is connected to the rear body 20. However, the connection among the vehicle tilting system 5, the front body 10, and the rear body 20 should not be limited to this case. The sliding base assembly 60 may be connected to the rear body 20, and the track assembly 50 may be connected to the front body 10, depending on the design requirements.

The spatial relationships among the track assembly 50, the sliding base assembly 60, and the tilt-positioning mechanism 70 are described above. The interactions among these components and their relationships with the operation of the tricycle 1 are described hereinafter.

Figure 6:
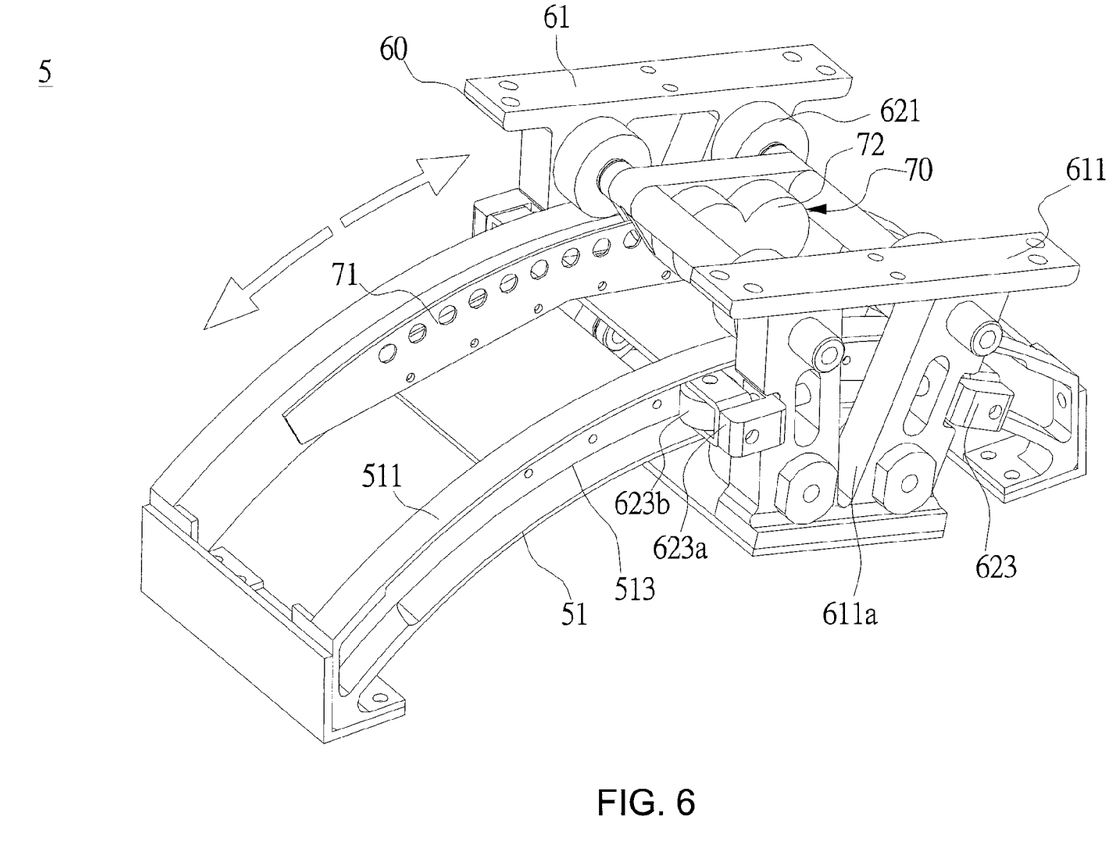
FIG. 6 is a schematic illustration of tilting with a vehicle tilting system of the present invention.
Figure 7:
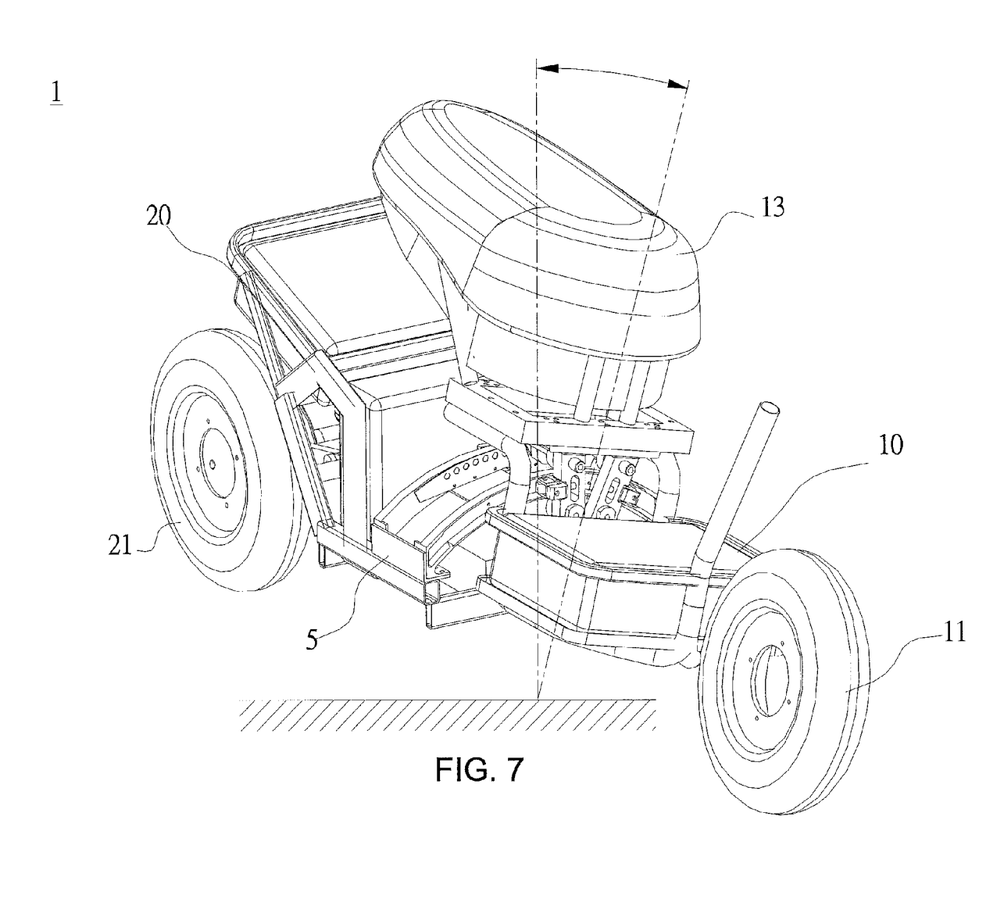
FIG. 7 is a schematic illustration of tilting of a tricycle of the present invention.

As shown in FIGS. 3, 6, and 7, the sliding base body 61 can slide along the arcuate tracks 51 by the contact of the roller sets 62 with the upper contact surfaces 511 and the lower contact surfaces 512. Moreover, the sliding base assembly 60 is connected to the front body 10, and the track assembly 50 is connected to the rear body 20. When a user manipulates the stem 12 to tilt the front body 10, the front body 10 drives the sliding base assembly 60 so that the sliding base assembly 60 slides with respect to the track assembly 50 but the rear body 20 does not tilt with the front body 10.

As described above, the tilt-positioning mechanism 70 is connected to the track assembly 50 and the sliding base assembly 60. When the holding element 72 grips the disc brake piece 71 in response to a request, the sliding base assembly 60 becomes stationary with respect to the track assembly 50. In the embodiment of the present invention, through an electronic control module (not shown), the tilt-positioning mechanism 70 adjusts the holding element 72 to grip or release the disc brake piece 71. In the embodiment of the present invention, the electronic control module is provided with a first preset speed and a second preset speed. The first preset speed is a value ranging from 7 to 10 km/h, and the second preset speed is a value ranging from 4 to 7 km/hr. The first preset speed is greater than the second preset speed. When the tricycle 1 accelerates above the first preset speed, the holding element 72 is separated from the disc brake piece 71, and thus the sliding base assembly 60 can slide with respect to the track assembly 50. This allows the front body 10 to tilt to balance the centrifugal force when the tricycle 1 turns.

When the tricycle 1 decelerates below the second preset speed, the electronic control module controls the holding element 72 to grip the disc brake piece 71 to prevent the sliding base assembly 60 from sliding with respect to the track assembly 50. Thus, the front body 10 is prevented from moving with respect to the rear body 20. The user does not need to lower a foot to maintain the balance of the tricycle 1. In other words, the two critical speeds at which the holding element 72 grips and releases the disc brake piece 71, respectively, are different. When the tricycle 1 accelerates, the control-critical speed is the first preset speed. When the tricycle 1 decelerates, the control-critical speed is the second preset speed. With the first preset speed greater than the second, the design eliminates unnecessary movements of the tilt-positioning mechanism 70 that could be caused by the speed of the tricycle 1 fluctuating between the critical speeds.

When the tricycle 1 is at rest, the holding element 72 still grips the disc brake piece 71, and therefore the tricycle 1 is unlikely to fall. For the embodiment of the present invention, when the tricycle 1 enters the high speed state from the low speed state, the holding element 72 slowly releases the disc brake piece 71, whereas when the tricycle 1 enters the low speed state from the high speed state, the holding element 72 grips the disc brake piece 71. The rate of the releasing and gripping of the disc brake piece 71 by the holding element 72 can be adjusted by the electronic control module to prevent safety problems caused by sudden locking or releasing of the disc brake piece 71. As described above, the weight of the rear body 20 of the tricycle 1 is significant. Keeping the rear body, equipped with the two rear wheels 21, in equilibrium without tilting is conducive to easier and safer cornering with the tricycle 1.

Hereinafter, the triangle formed by the touchdown points of the front wheel 11 and the two rear wheels 21 is defined as a stability triangle. The stability triangle has a longitudinal centerline. This stability triangle should be an isosceles triangle whose longitudinal centerline passes through the touchdown point of the front wheel 11. When the tricycle 1 corners, if the resultant of the weight of the front body 10 and the centrifugal force points to the outside of the stability triangle, the front body 10 may be unstable and the tricycle may stumble. As shown in FIGS. 1, 3, and 7, the upper contact surface 511 and the lower contact surface 512 of each of the two arcuate tracks 51 are parallel with each other; it shall be understood by those with the essential knowledge of the discipline that two parallel axisymmetric surfaces have a common axis. Therefore, the axis of the upper contact surface 511 and the axis of the lower contact surface 512 are coincident, i.e., the upper contact surface 511 and the lower contact surface 512 have a common axis, which is an axis of tilting L. The normal to the plane that the arc of the arcuate track 51 lies in is approximately parallel with the longitudinal centerline of the stability triangle so that the axis of tilting L of the vehicle tilting system 5 is also approximately parallel with the longitudinal centerline of the stability triangle. Moreover, the arcuate track 51 is arranged so that the axis of tilting L is close to the ground. For the embodiment of the present invention, if the axis of tilting L is exactly parallel with the longitudinal centerline of the stability triangle, then the maximum tilt angle of the vehicle tilting system 5 is approximately 30 degrees. That is, the sliding base assembly 60 can slide 30 degrees to either side of the midpoint of the arcuate track 51.

Due to the axis of tilting L of the present invention tricycle 1 being parallel with and close to the longitudinal centerline of the stability triangle, the resultant body force on the front body 10 almost always passes through the longitudinal centerline of the stability triangle. Consequently, the front body 10 always facilitates equilibrium. Even though cornering with a large centrifugal force or running over an uneven road surface may make the rear body 20 seemingly unstable, the stability of the front body 10 actually helps stabilize the rear body 20, and thus the rear body 20 does not overturn easily. In other words, the required stability of the tricycle 1 of the present invention can be achieved by using a narrow stability triangle. That is, the required stability can be achieved without increasing the width between the two rear wheels 21. Therefore, with the axis of tilting L close to and parallel with the longitudinal centerline of the stability triangle, the width between the two rear wheels 21 can be reduced to avoid the oversize problem with the traditional three-wheelers.

The dynamic equilibrium of the tricycle 1 is described above, and the mechanical interaction between the elements is described below.

As shown in FIG. 1, the vehicle tilting system 5 is substantially located below the saddle 13, and a gravity load F occurs when the user is seated in the saddle 13. To facilitate an explanation, an xyz coordinate system of the tricycle 1 is defined in FIG. 1. The gravity load is a downward force in the y direction. Due to this gravity load and the reaction force at the front wheel 11, the vehicle tilting system 5 is subjected to a torque in the −z direction by the front body 10, whereas the vehicle tilting system 5 is subjected to a +z torque by the rear body 20. In the vehicle tilting system 5 of the present embodiment, the two arcuate tracks 51 are arranged in parallel to form a track assembly 50, i.e., a two-separate-track design, which can suppress the deformation of the vehicle tilting system 5 caused by the bending moments.

As described above and shown in FIG. 2 and FIG. 5, the walls 513a taper from the inside face 514 to the outside face 514a. The walls of the groove 513 in the arcuate track 51 are thinner near the outside face 514a than near the inside face 514. When the track assembly 50 and the sliding base assembly 60 are subjected to bending moments, the sliding base assembly 60 undergoes a small rotation as a whole, and the upper roller 621 and the lower roller 622 are displaced along with the rotation of the sliding base assembly 60.

When the front body 10 is pushed up at its wheel, the upper roller 621 and the lower roller 622 near the rear body 20 are lowered, and the upper roller 621 and the lower roller 622 near the front body 20 are lifted, and therefore that the upper contact surface 511 of the arcuate track 51 near the rear body 20 is pressed by the lowering upper roller 621. The interaction between the upper roller 621 near the rear body 20 and the upper contact surface 511 is described below. When the upper roller 621 is lowered, if the upper contact surface 511 of the arcuate track 51 cannot be deformed, then the upper roller 621 only contacts the edge of the upper contact surface 511. The contact may result in high stress at the edge of the outer contact surface and reduction in the service life of the arcuate track 51. However, the thickness of the wall 513a of the groove 513 increases from the outside face 514a to the inside face 514, the wall 513a can be deformed by the lowering upper roller 621 to enlarge the area of contact between the upper roller 621 and the upper contact surface 511. This resolves the aforementioned stress concentration problem and increases the service life of the arcuate track 51. The interaction between the lower roller 622 near the front body 10 and the lower contact surface 512 is substantially the same as that described above. With the setup of the groove 513, the overall weight of the arcuate track 51 can be reduced while meeting the requirement for the moment of inertia.

As shown in FIGS. 1 and 2, when the front body 10 and the rear body 20 are fixed to each other (i.e., the holding element 72 grips the disc brake piece 71), and the rear body 20 is subjected to an external lateral force, the vehicle tilting system 5 is under a y-direction torque. Rotating in the y-direction with the rear body 20, the track assembly 50 exerts a leverage on the sliding base body 61. The side rollers 623 on the two sliding carriages 611, abutting against the outside faces 514a of the arcuate tracks 51, react to the deformation of the sliding base body 61. As the connecting element 623a of the side roller 623 can rotate with respect to the sliding carriage 611, the contact between the side roller 623 and the groove 513 is not a single-point support, and thus stress concentration on the surface of the arcuate track 51 is prevented. Meanwhile, the bottom plate 612 reinforces the two sliding carriages 611 to resist the twisting leverage exerted by the track assembly 51.

In summary, the vehicle tilting system provided by the present invention has at least the following advantage: By connecting the front body and the rear body with the track assembly and sliding base assembly, the rear body can stay stable when the tricycle turns and only the front body tilts.

The preferred embodiment of the present invention is only for the illustrative purpose. To avoid redundancy, not all the possible combinations of variations are documented herein. However, it shall be understood by those skilled in the art that each of the modules or elements described above may not be necessary. An implementation of the present invention may also contain other detailed conventional modules or elements. Each presented module or element may be omitted or modified depending on various needs. It is not necessarily true that no additional module or element can exist between any two of the presented modules.

We claim:

1. A vehicle tilting system, which is applicable to a tricycle, the tricycle comprising a front body and a rear body, the front body comprising a front wheel and the rear body comprising two rear wheels; wherein a stability triangle is formed by connecting a plurality of touchdown points of the front wheel and the two rear wheels, the stability triangle having a longitudinal centerline which passes through the touchdown point of the front wheel; wherein the front body and the rear body are connected with the vehicle tilting system, the vehicle tilting system comprising:
  a track assembly, which is arcuate in shape, comprising two arcuate tracks, each of the two arcuate tracks having an upper contact surface and a lower contact surface, the upper contact surface and the lower contact surface having a common axis as an axis of tilting of the track assembly, which is close to a ground and substantially parallel with the longitudinal centerline of the stability triangle; and
  a sliding base assembly, which is slidably disposed on both the upper contact surface and the lower contact surface of each of the two arcuate tracks of the track assembly, the sliding base assembly comprising a sliding base body and two roller sets, which are rotatably disposed on the sliding base body and slidably abuts against the arcuate tracks; wherein the sliding base comprises a pair of sliding carriages, the two roller sets being allocated to the two sliding carriages, respectively, the two roller sets being in rolling contact with the two arcuate tracks, respectively, each of the two roller sets comprising at least one upper roller and at least one lower roller, each said upper roller being in rolling contact with the upper contact surface of one of the two arcuate tracks, and each said lower roller being in rolling contact with the lower contact surface of one of the two arcuate tracks;
  wherein the front body and the rear body are connected via both the track assembly and the sliding base assembly of the vehicle tilting system.

2. The vehicle tilting system according to claim 1, wherein the track assembly is connected to the rear body and the sliding base assembly is connected to the front body.

3. The vehicle tilting system according to claim 2, wherein each of the two arcuate tracks has an inside face and an outside face, the inside face and the outside face are two opposite faces of the arcuate track; the outside face is not facing the other arcuate track, and the inside face is facing the other arcuate track; each of the two roller sets further comprises a side roller, which abuts against the outside face of each of the two arcuate tracks.

4. The vehicle tilting system according to claim 3, wherein a groove is further formed on the outside face of each of the two arcuate tracks, and each said side roller is allocated in the corresponding groove.

5. The vehicle tilting system according to claim 4, wherein each said sliding carriage comprises a pair of support columns, each said support column being aligned in the radial direction of the arcuate tracks, and each of the two roller sets being disposed on the corresponding pair of support columns.

6. The vehicle tilting system according to claim 5, wherein the sliding base body further comprises a bottom plate, which is connected to the pair of sliding carriages.

7. The vehicle tilting system according to claim 6, wherein said groove has a pair of walls, which taper from the inside face to the outside face of each of the two arcuate tracks.

8. The vehicle tilting system according to claim 7, wherein the side roller comprises a connecting element and a wheel body, the connecting element being rotatably connected to the corresponding support column, and the wheel body being rotatably connected to the connecting element.

9. The vehicle tilting system according to claim 8, wherein the track assembly further comprises at least one rib plate, which the pair of arcuate tracks are connected with.

10. The vehicle tilting system according to claim 9, further comprising a tilt-positioning mechanism, which is connected to the sliding base assembly and the track assembly and is intended to selectively stop the sliding base assembly to prevent the sliding base assembly from sliding with respect to the track assembly.

11. The vehicle tilting system according to claim 10, wherein the tilt-positioning mechanism comprises a disc brake piece and a holding element, the disc brake piece being fixed to the track assembly, the holding element being disposed on the sliding base assembly and adjustably gripping the disc brake piece.

12. The vehicle tilting system according to claim 11, wherein the rib plate has a plurality of attachment blocks, to which the disc brake piece is fixed.

13. A tricycle, comprising:
  a front body;
  a rear body; and
  a vehicle tilting system according to claim 1.

* * * * *